United States Patent
Cameron

[11] Patent Number: 5,947,417
[45] Date of Patent: Sep. 7, 1999

[54] FAIRING FOR AN EXPANDABLE BAY

[75] Inventor: Dean Emory Cameron, Maryland Heights, Mo.

[73] Assignee: McDonnell Douglas

[21] Appl. No.: 08/900,636

[22] Filed: Jul. 25, 1997

[51] Int. Cl.⁶ ..................................................... B64C 1/14
[52] U.S. Cl. ....................................................... 244/129.5
[58] Field of Search ................................ 244/130, 129.4, 244/129.5, 119, 118.1; 16/225

[56] References Cited

U.S. PATENT DOCUMENTS

| | | |
|---|---|---|
| 1,794,474 | 3/1931 | Von Miller . |
| 2,108,289 | 2/1938 | Laddon .................................... 244/121 |
| 2,749,064 | 6/1956 | Kuhlman, Jr. ........................... 244/137 |
| 2,915,948 | 12/1959 | Fehring ..................................... 89/37.5 |
| 3,128,068 | 4/1964 | Pauli ........................................ 244/129.5 |
| 3,147,942 | 9/1964 | Griffith ................................... 244/129.5 |
| 3,174,712 | 3/1965 | Ricard ..................................... 244/129.5 |
| 3,215,377 | 11/1965 | Jarecki ...................................... 244/134 |
| 3,718,171 | 2/1973 | Godwin ................................... 244/129.5 |
| 4,007,896 | 2/1977 | Reynolds, III ........................ 244/42 D |
| 4,088,288 | 5/1978 | Barnes .................................... 244/129.5 |
| 4,140,291 | 2/1979 | Evans et al. ........................... 244/129.5 |
| 4,167,258 | 9/1979 | Robertson .............................. 244/129.5 |
| 4,214,721 | 7/1980 | Burhans, Jr. et al. .............. 244/135 B |
| 4,411,399 | 10/1983 | Hapke ....................................... 244/130 |
| 4,697,764 | 10/1987 | Hardy et al. ........................... 244/137.4 |
| 4,781,342 | 11/1988 | Hardy et al. ........................... 244/137.4 |
| 4,802,641 | 2/1989 | Hardy et al. ........................... 244/137.4 |
| 4,838,502 | 6/1989 | Pinson ......................................... 244/49 |
| 4,911,219 | 3/1990 | Dalrymple ............................. 244/129.5 |
| 5,031,836 | 7/1991 | Ward .................................... 239/265.19 |
| 5,071,092 | 12/1991 | Williams et al. ........................ 244/130 |
| 5,522,566 | 6/1996 | Hardy et al. ........................... 244/137.1 |
| 5,582,365 | 12/1996 | Simmons ................................. 244/130 |
| 5,803,405 | 9/1998 | Ellis et al. ............................... 244/120 |

FOREIGN PATENT DOCUMENTS 815919   6/1969   Canada ................................ 244/129.5

*Primary Examiner*—Charles T. Jordan
*Assistant Examiner*—Theresa M. Wesson
*Attorney, Agent, or Firm*—Dale B. Halling

[57] ABSTRACT

A fairing (100) for an expandable bay of an has a ramp (108). A front linkage bar (102) has a first end pivotally connected to a finger (106) of the ramp (108) and a second end pivotally connected to the aircraft. A mating panel (112) is next to an interior edge (132) of the ramp (108) and pivotally connected to the ramp (108). An exterior elastomer panel (124) is connected between an exterior edge (126) of the ramp (108) and the aircraft.

13 Claims, 10 Drawing Sheets

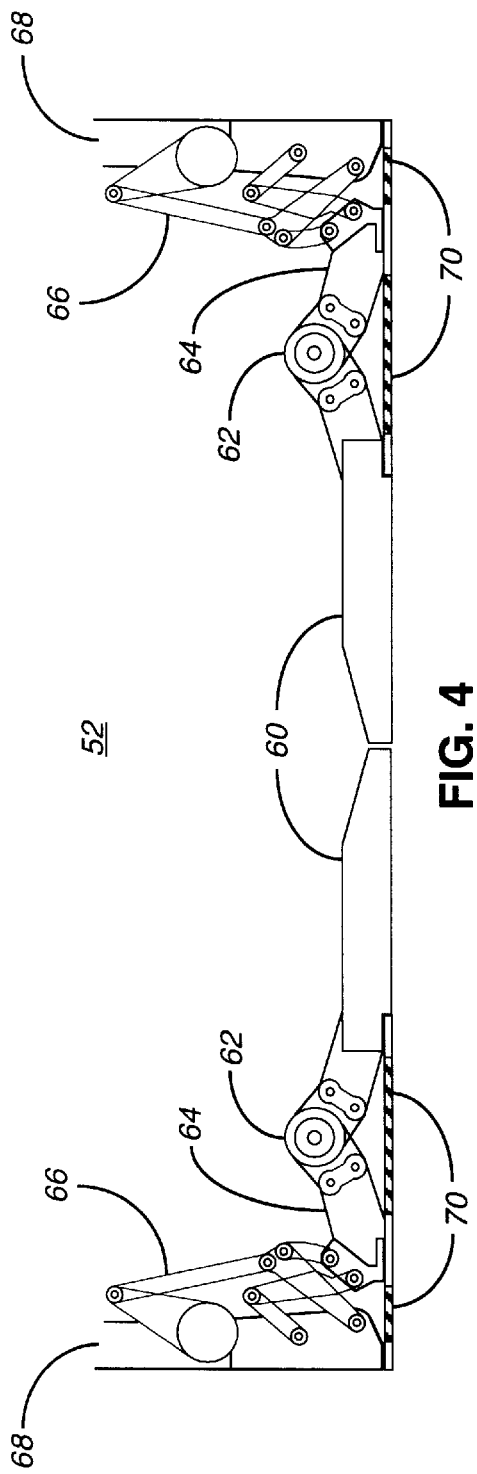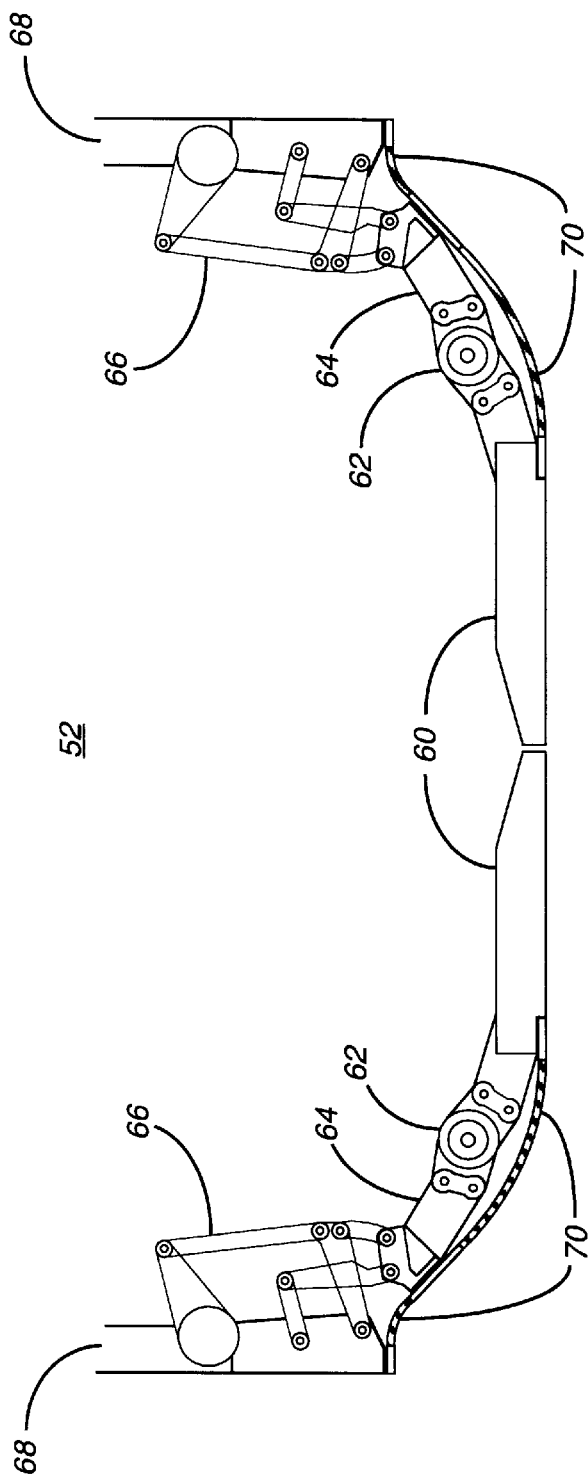

FAIRING FOR AN EXPANDABLE BAY

FIELD OF THE INVENTION

The present invention relates generally to the field of aircraft and more particularly to a fairing for an expandable bay.

BACKGROUND OF THE INVENTION

Aircraft are generally designed to carry their maximum load in the fuselage and/or wings of the aircraft. The fuselage of the aircraft is where any loads are stored in flight. In modern military aircraft, it is common for the aircraft to have ample thrust to carry larger loads than can fit within its fuselage. One way to take advantage of this extra thrust is to place these oversized loads externally. These external loads are attached to mounts on the wings or fuselage. An example of an aircraft 20 with a plurality of oversized loads 22, is shown in FIGS. 1 and 2. Unfortunately, these oversized loads 22 result in additional drag that limits the range of the aircraft. Expandable bays have been suggested as a solution to carry oversized loads. FIG. 3 shows a concept of an aircraft 50 with an expandable bay 52. The expandable bay 52 has access doors 54 and a front and back fairing 56, 58. One difficulty in producing an effective expandable bay 52 is producing a fairing that does not require significant space in the fuselage.

Thus, there exists a need for a fairing for an expandable bay of an aircraft that does not require significant space in the fuselage.

SUMMARY OF THE INVENTION

A fairing for an expandable bay of an aircraft that overcomes these and other problems has a ramp. A front linkage bar has a first end pivotally connected to a finger of the ramp and a second end pivotally connected to the aircraft. A mating panel is next to an interior edge of the ramp and pivotally connected to the ramp. An exterior elastomer panel is connected between an exterior edge of the ramp and the aircraft.

BRIEF DESCRIPTION OF THE DRAWINGS

FIGS. 4 & 5 are cross sectional views of an embodiment of an expandable bay;

DETAILED DESCRIPTION OF THE DRAWINGS

Figure 1:
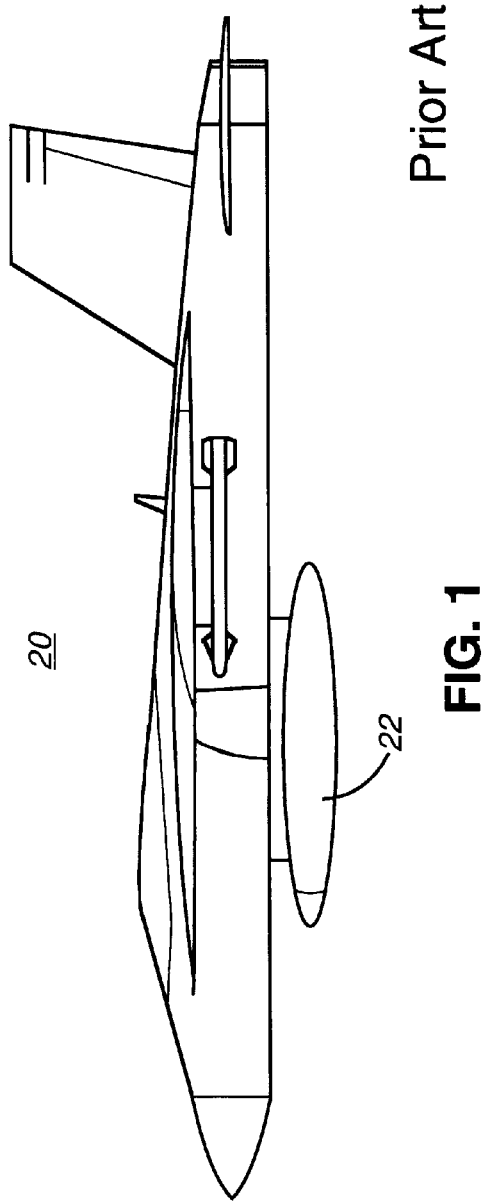
FIG. 1 is a side view of a prior art aircraft.
Figure 2:
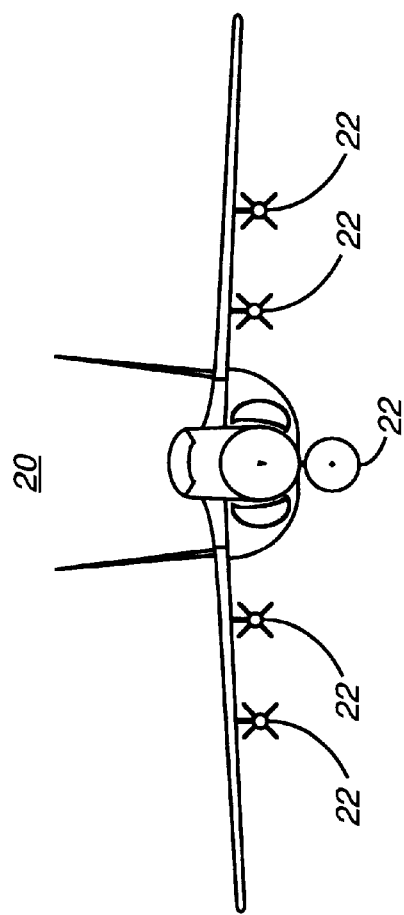
FIG. 2 is a front view of the prior art aircraft of FIG. 1.
Figure 3:
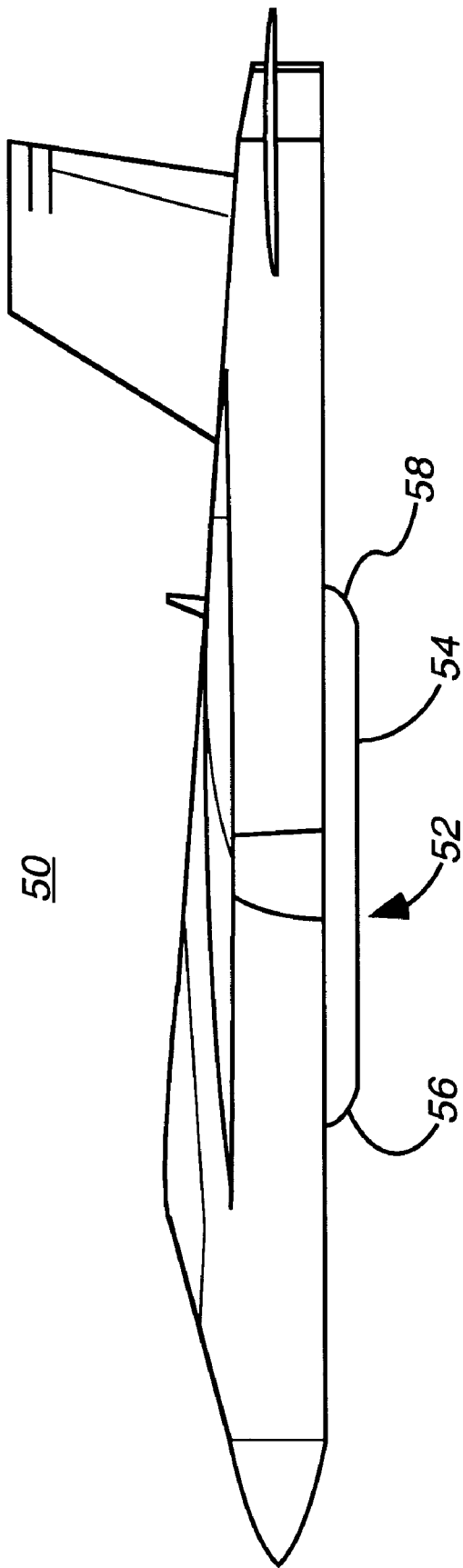
FIG. 3 is a side view of an aircraft with an expandable bay.

FIGS. 4 & 5 show an embodiment of the access doors 52 of an expandable bay. The access doors 52 have a pair of panels 60 connected to a simple hinge 62. The simple hinge 62 is connected to a bar 64. The bar 64 is connected to a six bar hinge 66. The six bar hinge 66 is connected to the frame 68 of the aircraft. A plurality of reinforced elastomer panels 70 cover the gaps. The reinforced elastomer panels 70 are capable of being stressed up to 150% beyond its normal shape and still bounces back to its original shape.

Figure 6:
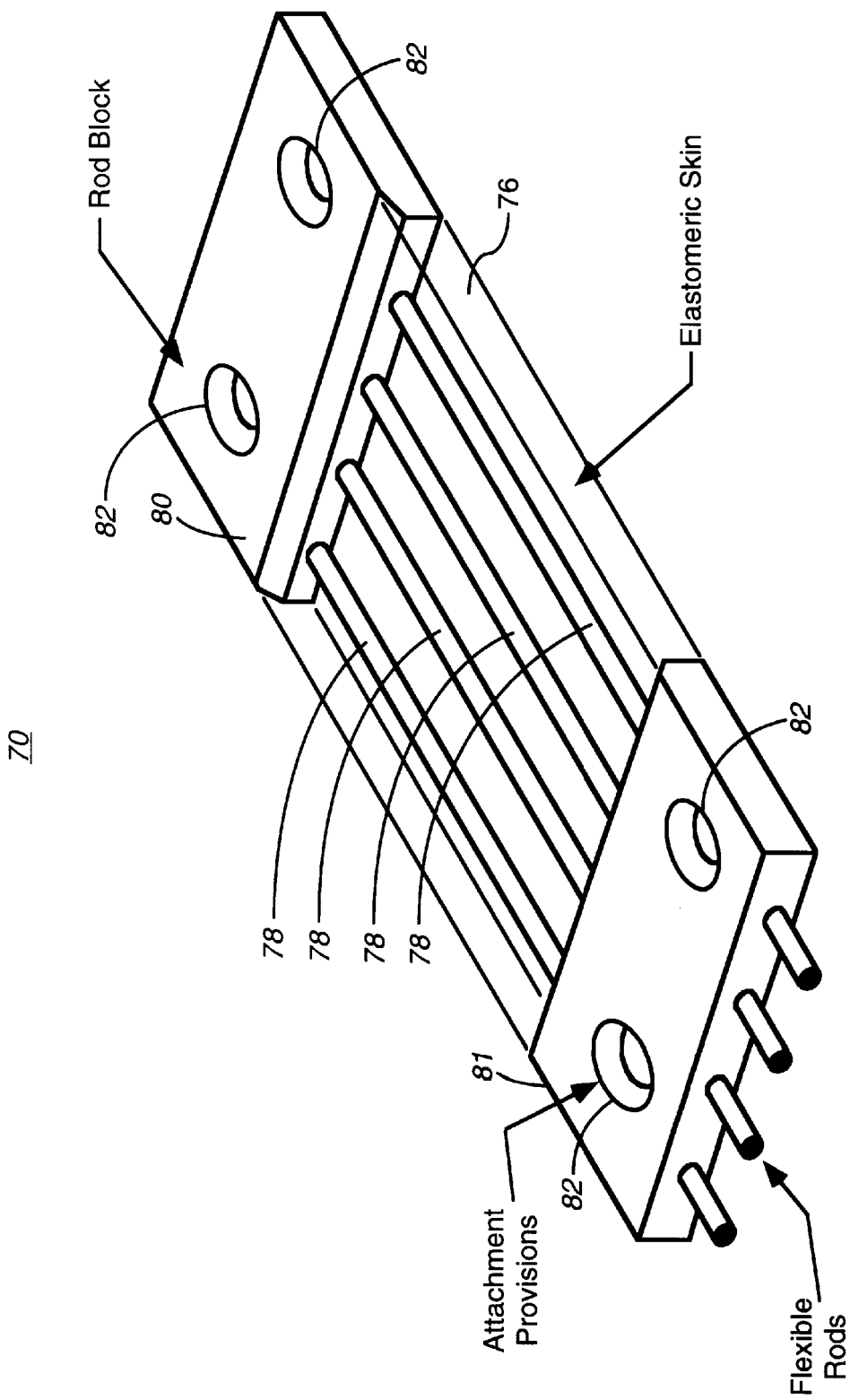
FIG. 6 is a perspective view of a reinforced elastomer panel.

FIG. 6 shows a perspective drawing of an embodiment of the reinforced elastomer panels 70. An elastomeric skin 76 has a plurality of flexible rods 78 running longitudinally through the elastomeric skin 76. The flexible rods are typically made of quartz epoxy. The flexible rods 78 can slide within the elastomeric skin 76. The elastomeric skin 76 is attached at each end to a pair of rod blocks 80, 81. The flexible rods 78 are attached to the rod block 80 and slide within the rod block 81. The rod blocks 80, 81 have a plurality of counter sunk screw holes 82 for attachment to the aircraft.

Figure 7:
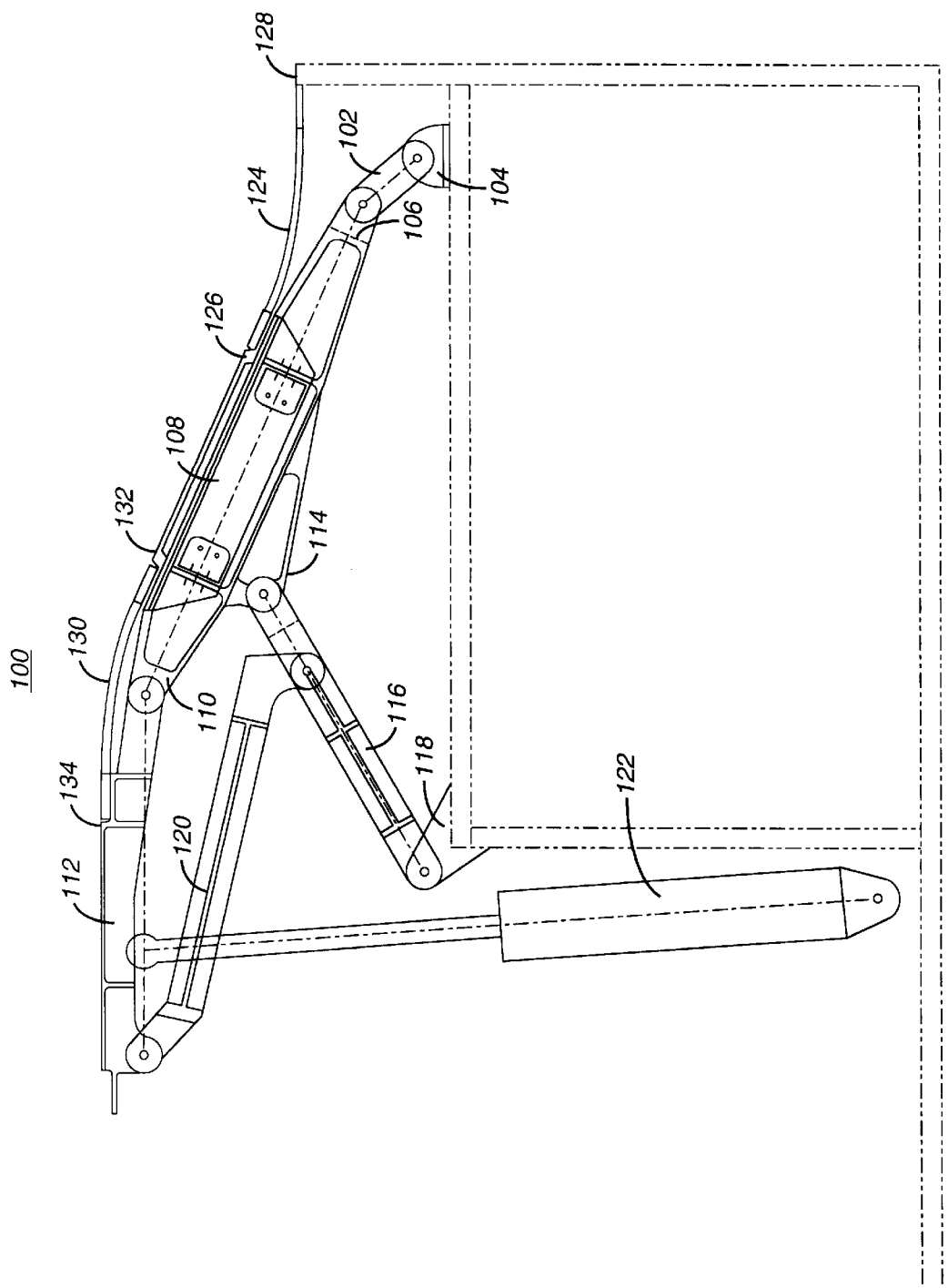
FIG. 7 is a cross sectional view of a fairing in an expanded position.
Figure 8:
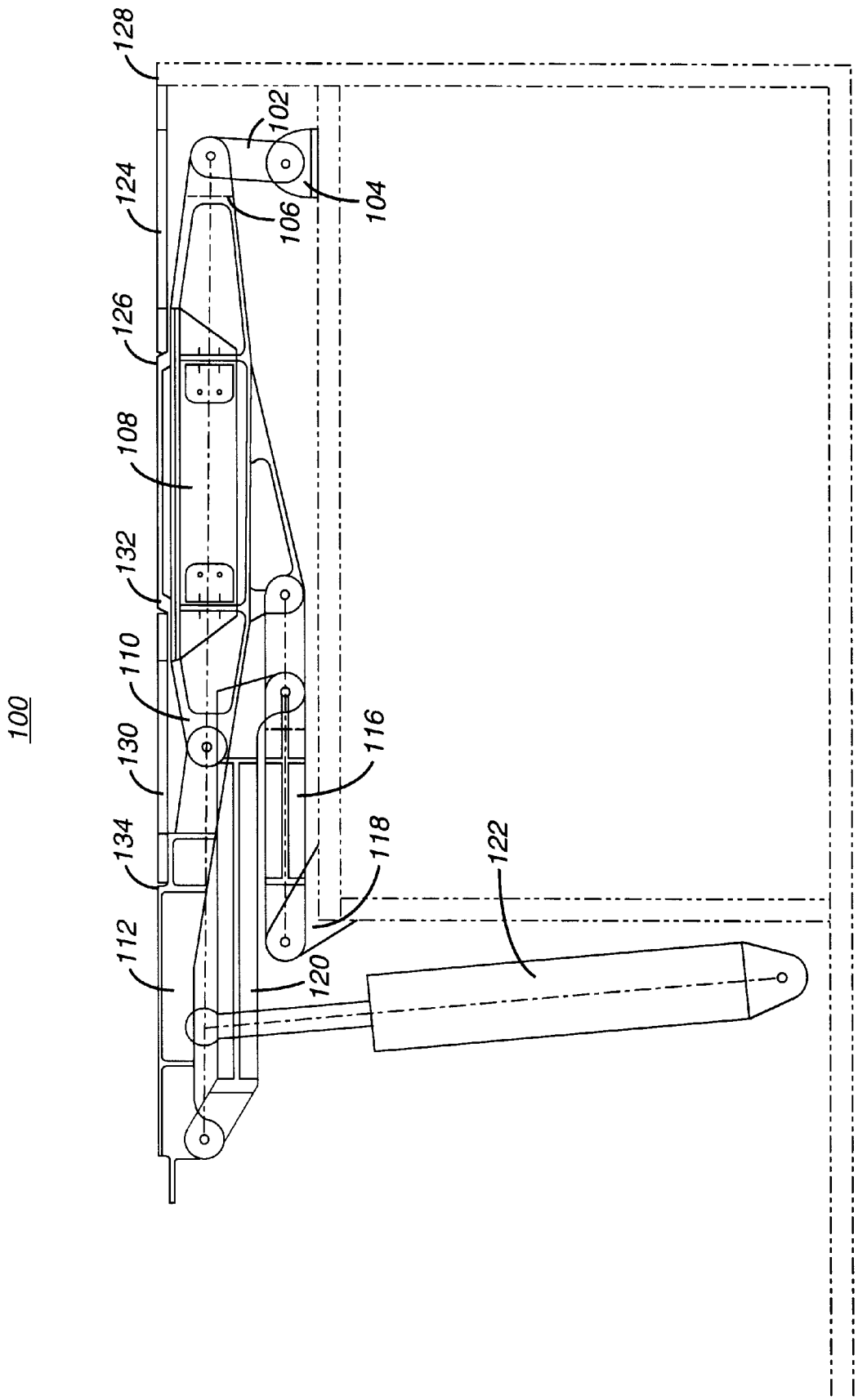
FIG. 8 is a cross sectional view of the fairing of FIG. 7 in an retracted position.

FIGS. 7 & 8 show a cross sectional view of a fairing 100 according to the invention. The fairing 100 can be used with the embodiment of the expandable bay shown in FIGS. 4 & 5 or with other expandable bays. The fairing design is essentially the same for both the front fairing and the rear fairing. A front linkage bar 102 is pivotally connected at a first end to a mount 104 of the aircraft. A second end of the front linkage mechanism 102 is pivotally connected to a linkage stub 106 of a ramp 108. A finger 110 of the ramp 108 is pivotally connected to a mating panel 112. A chest 114 of the ramp 108 is pivotally connected to a back linkage bar 116. A second end of the back linkage bar 116 is pivotally connected to a mount 118 of the aircraft. A mating panel linkage bar 120 is pivotally connected to the back linkage bar 116. A second end of the mating panel linkage bar 120 is pivotally connected to the mating panel 112. An actuation mechanism (linear actuator) 122 is pivotally connected to the mating panel and moves the fairing from a flush position (see FIG. 8) to an expanded position (FIG. 7). The actuation mechanism is shown as a hydraulic piston, but can be mechanical or electromechanical. An exterior elastomer panel 124 is connected between an exterior edge 126 of the ramp and the aircraft skin 128. An interior elastomer panel 130 is connected between an interior edge 132 of the ramp 108 and an adjacent edge 134 of the mating panel 112. The elastomer panels 124, 130 are reinforced elastomer panels like the one shown in FIG. 6.

Figure 9:
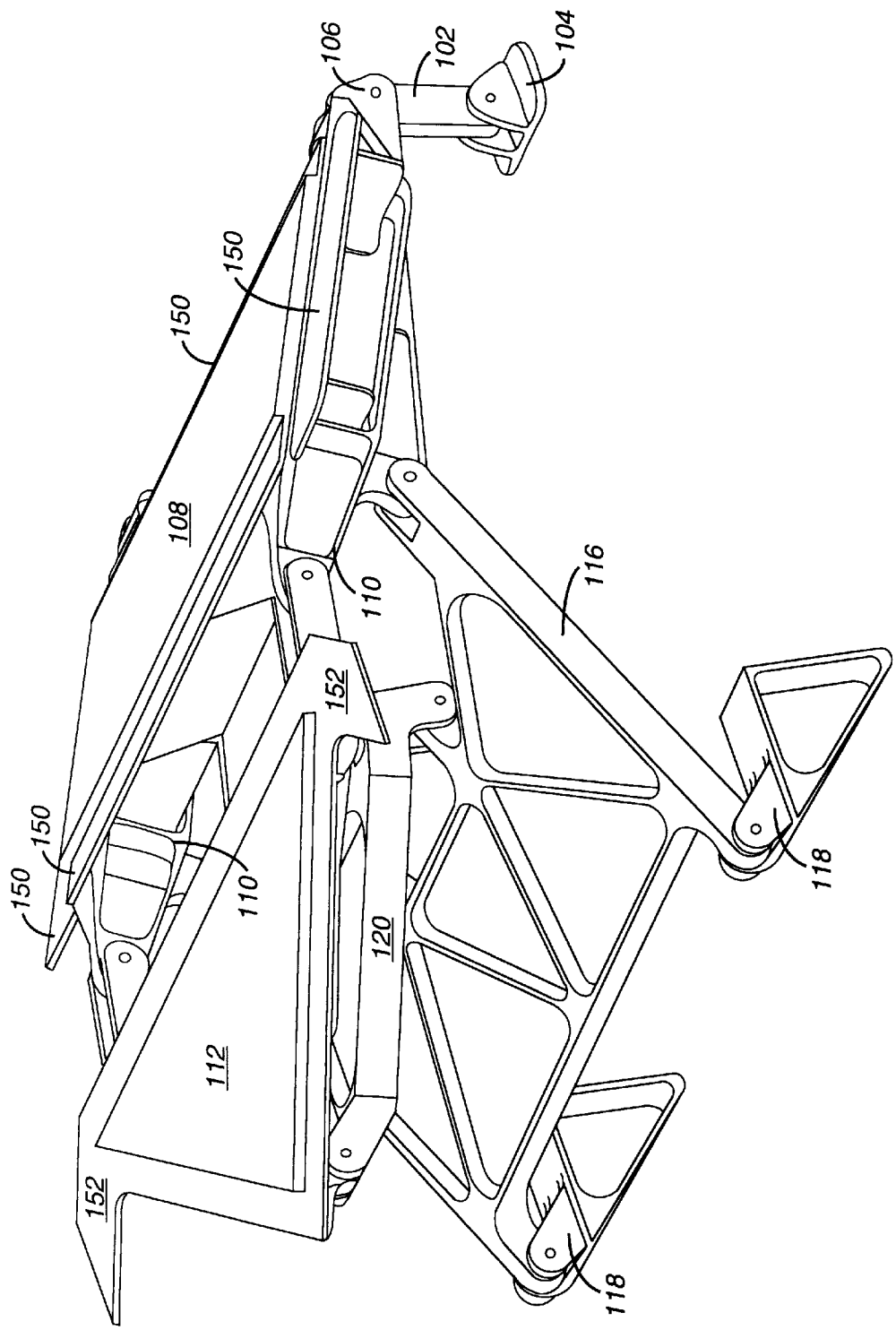
FIG. 9 is a top right perspective view of the fairing actuator mechanism in an expanded position.
Figure 10:
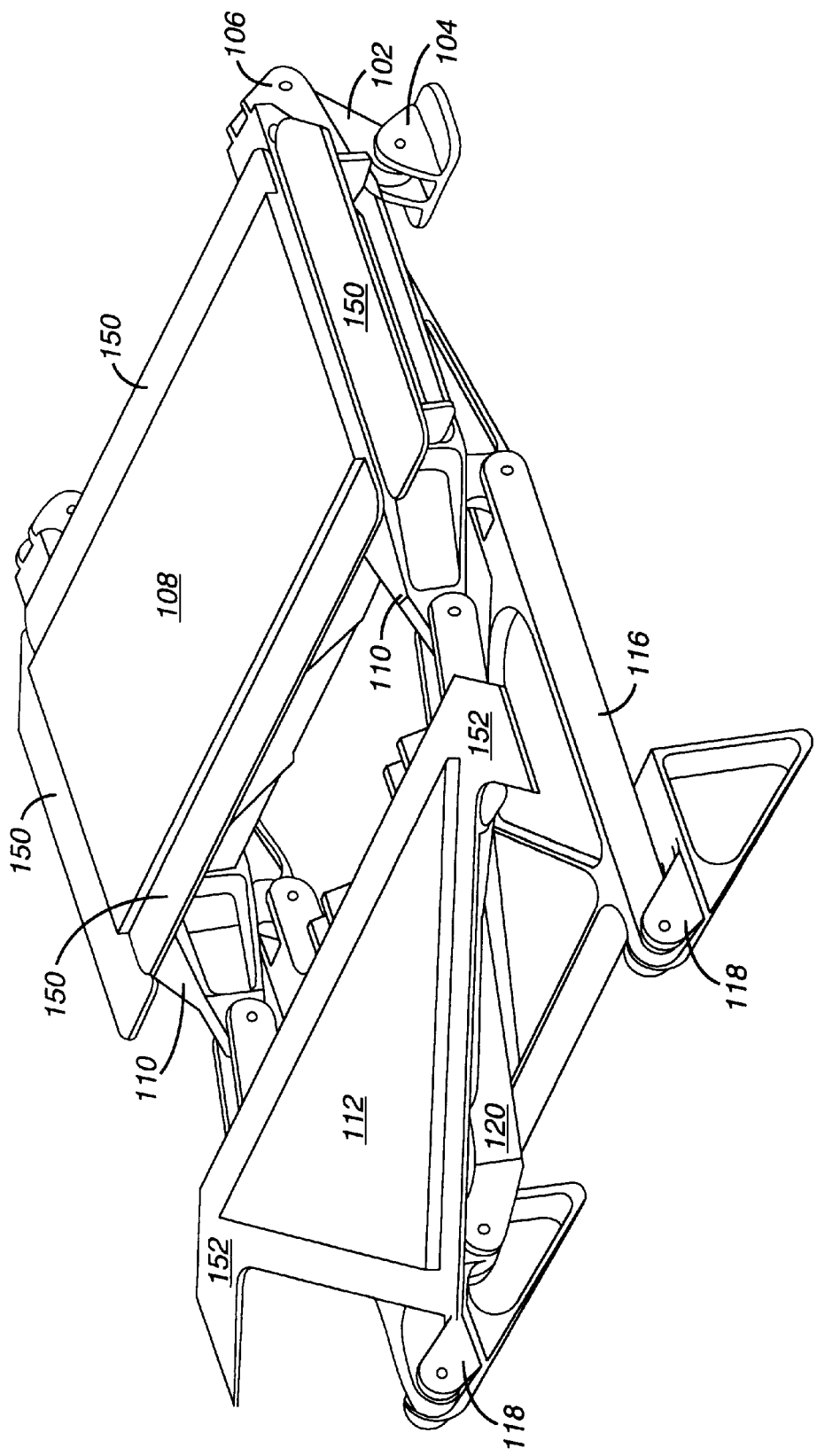
FIG. 10 is a top right perspective view of the fairing actuator mechanism in an retracted position.

FIGS. 9 & 10 show a top right perspective drawing of the fairing actuation mechanism. The ramp 108 has an exterior surface that is rectangular. The ramp 108 has a lip 150 that is used for attaching the reinforced elastomer panels. The mating panel 112 has an exterior surface that is triangular. The mating panel 112 also has a lip 152 for attaching reinforced elastomer panels.

Figure 11:
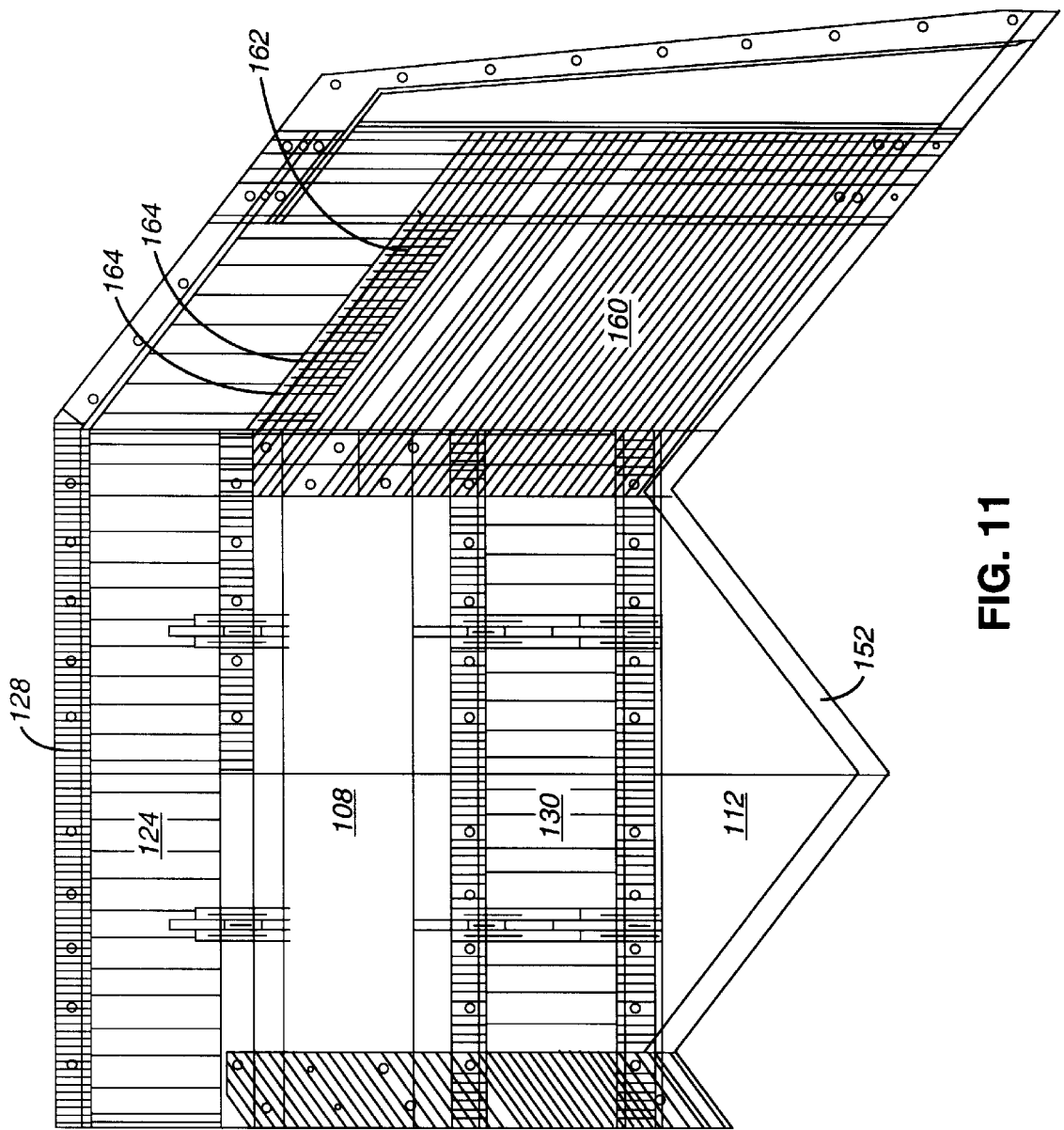
FIG. 11 is a partial top view of an embodiment of the fairing.
Figure 12:
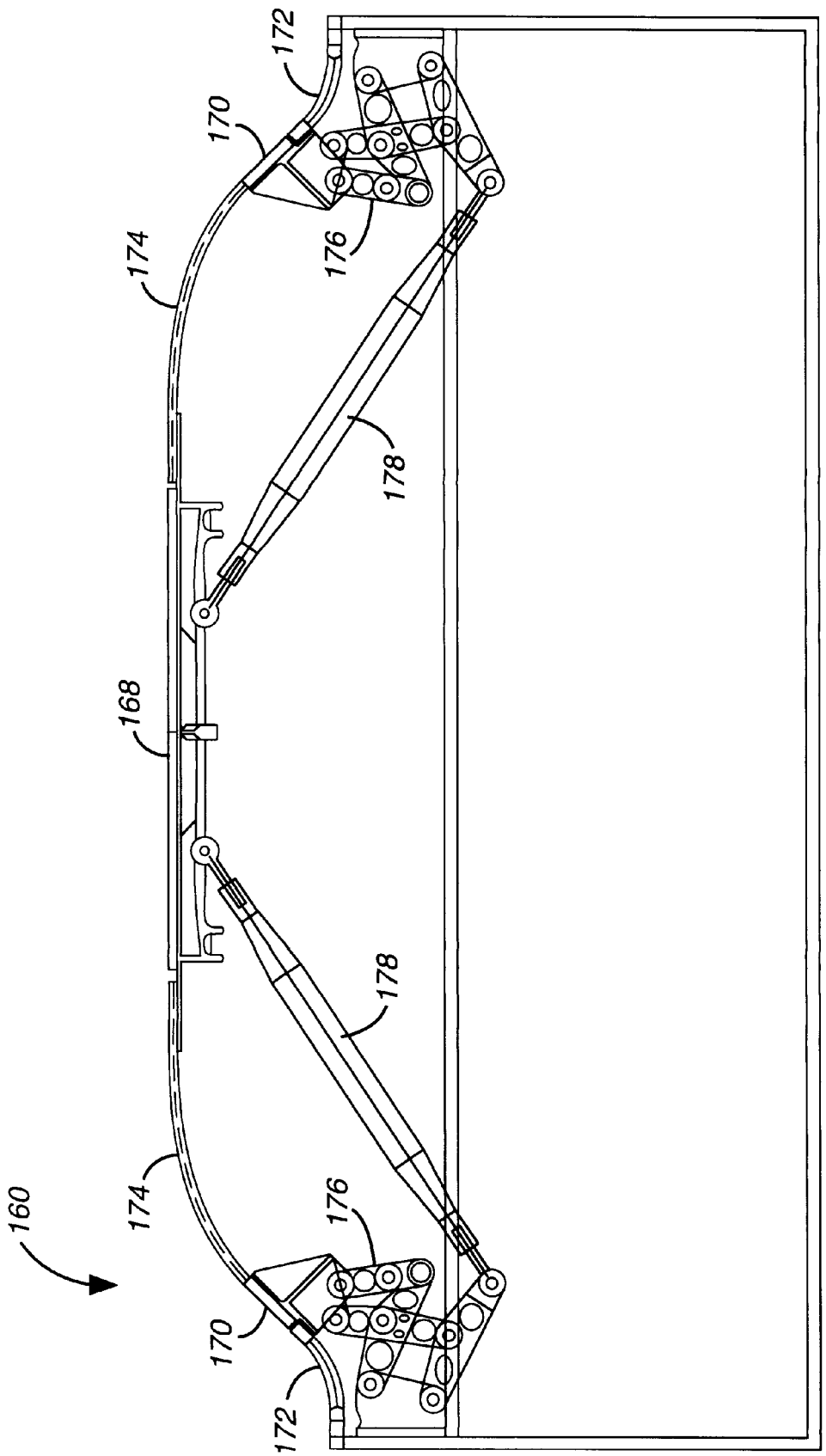
FIG. 12 is a cross sectional view of an embodiment of the fairing.

FIG. 11 is a partial top view of an embodiment of the fairing 100. A side elastomer panel 160 is shown connected to the aircraft (skin), the ramp and the mating panel 112. Where the side elastomer panel 160 and the front elastomer panel 124 meet 162, a plurality of bushing 164 are embedded in the elastomer skin. The reinforcing rods from the front elastomer panel 124 slide freely within the bushings. In another embodiment shown in FIG. 12, a bar 170 breaks the side elastomer panel 160 into a first elastomer panel 172 and a second elastomer panel 174. A six bar hinge 176 connects the bar 170 to the aircraft frame. A side linkage bar 178 is pivotally connected to the six bar linkage 176 and to the ramp 108.

Thus there has been described a fairing for an expandable bay of an aircraft that does not require significant space in the fuselage. In addition, the fairing achieves vertical translation of the mating panel 112 using only rotation joints. This reduces the weight and maintenance compared to sliding joints. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A fairing for an expandable bay of an aircraft comprising:
    a ramp;
    a front linkage bar having a first end pivotally connected to a finger of the ramp and a second end pivotally connected to the aircraft;
    a mating panel next to an interior edge of the ramp and pivotally connected to the ramp;
    an exterior elastomer panel connected between an exterior edge of the ramp and the aircraft; and
    an interior elastomer panel connected between the interior edge of the ramp and an adjacent edge of the mating panel.

2. The fairing of claim 1, further including an actuation mechanism pivotally connected to the mating panel.

3. The fairing of claim 1, further including a back linkage bar having a first end pivotally connected to the aircraft and having a second end connected to the ramp.

4. The fairing of claim 3, further including a mating panel linkage bar having a first end pivotally connected to the mating panel and having a second end pivotally connected to the back linkage bar.

5. The fairing of claim 1, wherein the ramp has an exterior surface that is rectangular.

6. The fairing of claim 1, wherein the mating panel has an exterior surface that is triangular.

7. A fairing for an expandable bay of an aircraft, comprising:
    a ramp;
    a front linkage bar having a first end pivotally connected to the ramp and a second end pivotally connected to the aircraft;
    a mating panel pivotally connected to the ramp; and
    a reinforced elastomer system connected between a skin of the aircraft and an exterior surface of the ramp and between the exterior surface of the ramp and an exterior surface of the mating panel.

8. The fairing of claim 7, further including an actuation mechanism pivotally connected to the mating panel.

9. The fairing of claim 7, further including a back linkage bar having a first end connected to a chest of the ramp and having a second end pivotally connected to the aircraft.

10. The fairing of claim 9, further including a mating panel linkage bar having a first end pivotally connected to the mating panel and having a second end pivotally connected to the back linkage bar.

11. A fairing actuation mechanism for an expandable bay of an aircraft, comprising:
    a mating panel;
    a ramp having a finger pivotally connected to the mating panel;
    a back linkage bar having a first end pivotally connected to the aircraft and a second end pivotally connected to the ramp; and
    a mating panel linkage mechanism having a first end pivotally connected to the mating panel and a second end pivotally connected to the back linkage bar.

12. The fairing actuation mechanism of claim 11, further including a linear actuator pivotally connected at a first end to the aircraft and a second end pivotally connected to the mating panel.

13. The fairing actuation mechanism of claim 11, further including a front linkage bar having a first end pivotally connected to the aircraft and have a second end connected to the ramp.

* * * * *